United States Patent [19]

Kunii et al.

[11] 4,269,153

[45] May 26, 1981

[54] INTERNAL COMBUSTION ENGINE WITH FUEL INJECTOR

[75] Inventors: Kazuya Kunii; Saburo Tsutsumi, both of Yokohama; Shizuo Ishizawa, Yokosuka, all of Japan

[73] Assignee: Nissan Motor Company, Limited, Yokohama, Japan

[21] Appl. No.: 27,141

[22] Filed: Apr. 4, 1979

[30] Foreign Application Priority Data

Apr. 15, 1978 [JP] Japan .............................. 53-50416[U]

[51] Int. Cl.³ ............................................. F02B 31/00
[52] U.S. Cl. .................................... 123/308; 123/432
[58] Field of Search .......... 123/75 B, 119 D, 119 DB, 123/124 R, 308, 432; 261/63 A

[56] References Cited

U.S. PATENT DOCUMENTS

| | | | |
|---|---|---|---|
| 3,174,469 | 3/1965 | Rappolt | 123/119 D |
| 3,313,278 | 4/1967 | Thuesen | 123/75 B |
| 3,331,361 | 7/1967 | Baudry | 123/75 B |
| 4,194,474 | 3/1980 | Endo | 123/75 B |

FOREIGN PATENT DOCUMENTS 2559415  8/1976  Fed. Rep. of Germany ......... 123/75 B

*Primary Examiner*—Ronald H. Lazarus

[57] ABSTRACT

An engine is equipped with a fuel injector in an intake passageway immediately upstream of an intake valve. Air introduced from the intake passageway upstream of a throttle valve is ejected toward a clearance between the valve head of the intake valve and a valve seat, when the intake valve is opened. The ejected air stream strikes against the sprayed fuel injected from the fuel injector to improve the atomization of injected fuel and to form homogeneous air-fuel mixture to be inducted into the combustion chamber of the engine.

9 Claims, 3 Drawing Figures

INTERNAL COMBUSTION ENGINE WITH FUEL INJECTOR

BACKGROUND OF THE INVENTION

This invention relates in general to an internal combustion engine equipped with a fuel injector for injecting the fuel into an intake passageway immediately upstream of a combustion chamber, and more particularly to an improvement in an air induction system of the engine to improve the character of air-fuel mixture to be supplied to the combustion chamber.

It is well known that the following advantages can be obtained by an internal combustion engine equipped with a fuel injectors for injecting fuel immediately upstream of combustion chambers: (1) In case of a multicylinder engine, fuel distribution to the cylinders is better, and uniform air-fuel mixtures can be supplied to the cylinders, improving the engine torque at low speed. (2) It is possible to cut the fuel supply during deceleration and to minimize the retardation of fuel supply, achieving the improvements in fuel economy etc.

However, a conventional fuel injector is arranged to inject fuel at a relatively low pressure such as 2 Kg/cm$^2$ and accordingly atomization of the fuel is not good so that relatively large size fuel particles are injected from the injector. Such an arrangement is employed in a point of view of lowering production and operation costs. Further, since the distance from the fuel injector to the combustion chamber is short as compared with the case of an engine using a carburetor, homogenization of the air-fuel mixture is not sufficient and therefore the combustion chamber cannot be supplied with air-fuel mixture of better character.

Otherwise, it has also been proposed to promote the atomization of fuel by employing a so-called supersonic nozzle. However, this requires a separate pressurized air supply device, by which production and operation costs are unavoidably rendered considerably high.

SUMMARY OF THE INVENTION

This invention contemplates to solve the problems encountered in conventional engiens equipped with a fuel injector, by ejecting gases such as air into an intake passageway immediately upstream of a combustion chamber. The ejected gases functions to promote the atomization of fuel so as to homogenize air-fuel mixture to be supplied to the combustion chamber.

It is the prime object of the present invention to provide an improved internal combustion engine equipped with a fuel injector, which can maintain stable engine running throughout whole operating conditions, improving fuel economy and exhaust emission control.

Another object of the present invention to provide an improved internal combustion engine equipped with a fuel injector, in which the character of the air-fuel mixture to be supplied to the combustion chamber of the engine is improved without considerable rise in production and operation costs.

A still another object of the present invention to provide an improved internal combustion engine equipped with a fuel injector, in which the atomization of the fuel injected from the fuel injector is improved to produce homogeneous air-fuel mixture in an intake passageway fluidly connected to a combustion chamber.

A further object of the present invention is to provide an improved internal combustion engine equipped with a fuel injector, by which uniform air-fuel mixture can be supplied to a plurality of combustion chambers to maintain stable engine running.

A still further object of the present invention to provide an improved internal combustion engine equipped with a fuel injector, in which the character of the air-fuel mixture can be improved even in the combustion chamber since swirl of the air-fuel mixture is effectively generated by virtue of high speed air stream ejected into the combustion chamber when an intake valve is opened.

Other objects, features and advantages of the engine in accordance with the present invention will be more apparent from the following description taken in conjunction with the accompanying drawings.

DESCRIPTION OF THE PREFERRED EMBODIMENTS

Figure 1:
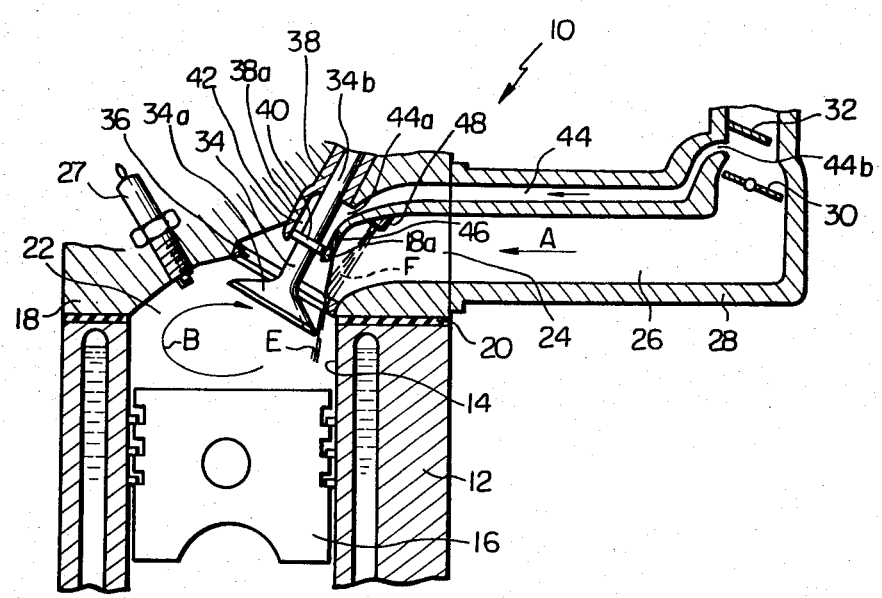
FIG. 1 is a schematic cross-sectional view of a preferred embodiment of an internal combustion engine in accordance with the present invention.

Referring now to FIG. 1 of the drawings, there is shown a preferred embodiment of an internal combustion engine 10 in accordance with the present invention, which comprises a cylinder block 12 in which a cylinder bore 14 or cylinder bores are formed. A piston 16 is reciprocally disposed in the cylinder bore 14. A cylinder head 18 is secured through a head gasket 20 on the top surface of the cylinder block 12. A combustion chamber 22 is defined between the crown of the piston 16 and the surface of a concavity (no numeral) formed at the cylinder head 18. The combustion chamber 22 is communicable with an intake port or passage 24 formed in the cylinder head 18, the intake port 24 forming part of an intake passageway 26 through which the combustion chamber 22 is communicable with ambient air. A spark plug 27 is as usual securely disposed through the cylinder head 18 so that its electrodes project into the combustion chamber 22. As shown, an intake manifold 28 defines therein a part of the intake passageway 26. A throttle valve 30 is pivotally movably disposed in the intake passageway 26 to control the amount of intake air inducted or supplied to the combustion chamber 22. The reference numeral 32 represents a member forming part of an air flow meter which senses the amount of the intake air supplied to the combustion chamber 22. As viewed, the member 32 of the air flow meter is disposed in the intake passageway 26 upstream of the throttle valve 30.

Figure 2:
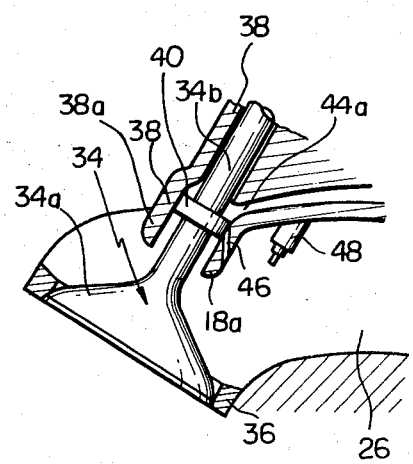
FIG. 2 is an enlarged cross-sectional view of an essential part of the engine of FIG. 1.

An intake valve 34 includes a valve head 34a which is seatable on a valve seat 36 secured to the cylinder head 18. The combustion chamber 22 and the intake port 24 communicate with each other through an opening (no numeral) defined by the annular inner surface of the valve seat 36. The valve stem 34b of the intake valve 34 is slidably disposed in a valve guide 38 secured to the cylinder head 18. As shown, the valve guide 38 is formed with an extension 38a which extends along and surrounds the valve stem 34b. Further, the inner surface of the extension is spaced apart from the cylindrical surface of the valve stem 34b. The extension 38a incorporates with an extension 18a of the cylinder head 18 to form a cup-shaped wall section (no numeral). An annular piston valve member 40 is securely mounted on the valve stem 34b such that the peripheral surface of the piston valve member 40 slidably contacts the inner cylindrical surface of the cup-shaped wall section. The piston valve member 40 defines a small air chamber 42 in the interior of cup-shaped wall section. The air chamber 42 communicates at its upper portion with an additional air passage 44 through an opening 44a. The additional air passage 44 communicates through an opening 44b with the intake passageway 26 between the member 32 of the air flow meter and the throttle valve 30. In this case, the additional air passage 44 is formed in the cylinder head 18 and the wall portion of the intake manifold 28. The piston valve member 40 is located to close a straight elongate opening 46 formed through the wall of the extension 18a when the intake valve 34 is closed, i.e., the valve head 34a seats on the valve seat 36 as shown in FIG. 2.

The elongate opening 46 is such formed that extension (no numeral) of the axis thereof passes through a clearance defined between the periphery of the valve head 34a and the inner periphery of the valve seat 36 to reach the combustion chamber 22. It will be understood that air supplied to the air chamber 42 is ejected through the elongate opening 46 at a high speed toward the combustion chamber 22.

A fuel injection nozzle 48 forming part of a fuel injector is disposed to be projected into the intake port 24 and directed to the valve head 34a of the intake valve 34. It is to be noted that the axis of the nozzle 48 intersects the axis of the elongate opening 46 at an angle ranging from 30° to 120°, preferably 60°. The fuel injector is constructed and arranged to inject fuel in the amount controlled in accordance with various engine operating parameters such as intake air amount sensed by the above-mentioned air flow meter.

With the thus arranged engine, when the vacuum is generated in the combustion chamber 22 by the decent of the piston 16 and the intake valve 34 is opened as shown in FIG. 1, intake air is inducted into the combustion chamber 22 through the intake manifold 28 in the direction of an arrow A. Then, the sprayed fuel F is injected from the fuel injection nozzle 48 toward the valve head 34a of the intake valve 34 since the fuel injector 48 is arranged, in this case, to inject fuel simultaneously with the opening of the intake valve 34. Additionally, the elongate opening 46 is then opened by the downward movement of the piston valve member 40 and accordingly air flows through the additional air passage 44 and the air chamber 42 to eject air E at a high speed. The ejected air E from the elongate opening 46 strikes against the sprayed fuel injected from the injection nozzle 48 to roll therein the sprayed fuel and thereafter the sprayed fuel F is effectively carried and introduced into the combustion chamber 22 through the clearance between the valve head 34a and the valve seat 36.

As will be understood, since the sprayed fuel F from the fuel injection nozzle 48 strikes against the high speed air stream, the atomization and vaporization of the fuel is promoted to accomplish sufficient mixing of air fuel. This produces homogeneous air-fuel mixture in the combustion chamber 22 and therefore the combustion of the air-fuel mixture in the combustion chamber 22 is effectively improved. Further, by virtue of the high speed air stream from the elongate opening 46, swirl of the air-fuel mixture indicated by an arrow B can be generated in the combustion chamber 22, which contributes to the improvement in combustion of the air-fuel mixture, extending an lean (air-fuel mixture) operating limit and an exhaust gas recirculation (EGR) limit out of which stable engine operation cannot maintained.

Figure 3:
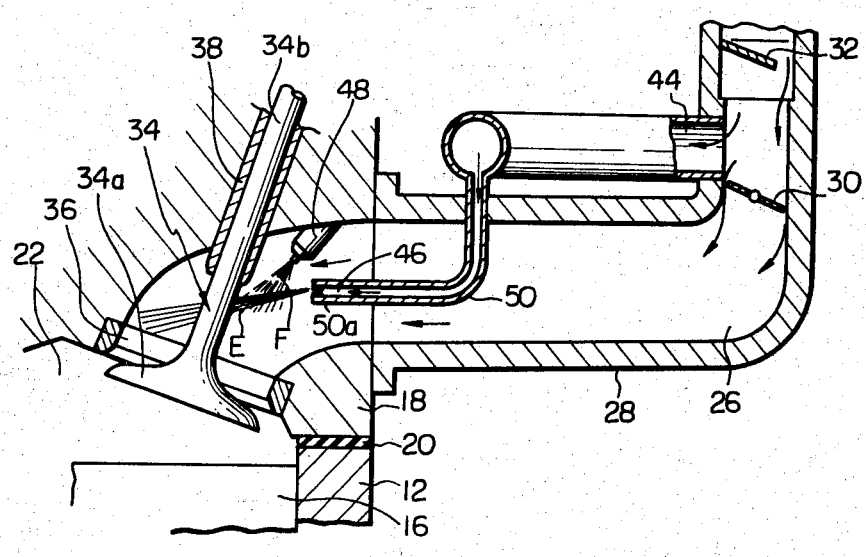
FIG. 3 is a schematic cross-sectional view of another preferred embodiment of the engine in accordance with the present invention.

FIG. 3 illustrates another preferred embodiment of the engine in accordance with the present invention, which is substantially similar to the embodiment of FIG. 1 and accordingly like reference numerals are assigned to like parts and elements. In this case, an additional air nozzle 50 is projected through the wall of the intake manifold 28 into the intake passageway 26. The air nozzle 50 is formed with a straight elongate pipe portion 50a in which the straight elongate opening 46 is defined. The air nozzle 50 communicates through the additional air passage 44 with the intake passageway 26 between the throttle valve 30 and the member 32 of the air flow meter. The tip or free end of the straight elongate portion 50a of the nozzle 50 lies immediately below the fuel injection nozzle 48. It is to be noted that the straight elongate pipe portion 50a is such located that its axis intersects the axis of the fuel injection nozzle 48 at an angle ranging from 39° to 120°.

With this arrangement, when the vacuum is generated in the combustion chamber 22, air is ejected at a high speed from the tip of the air nozzle toward the valve seat 36. Then, the ejected air E strikes against fuel F injected from the fuel injection nozzle 48, effectively atomizing the injected fuel. As a result, the air-fuel mixture containing highly atomized fuel is inducted into the combustion chamber 22 through the clearance between the intake valve head 34a and the inner periphery of the valve seat 36.

As appreciated from the foregoing discussion, by virtue of the engine according to the present invention, the following significant advanteas can be attained:

(1) The air-fuel mixture to be inducted into the combustion chamber is highly atomized and homogenized, improving the character of the air-fuel mixture. Accordingly, stable engine operation can be maintained even with considerably lean air-fuel mixture and with a large amount of EGR gas which is recirculated back to the combustion chamber of the engine, improving exhaust emission control and fuel economy.

(2) Since it is possible to locate the fuel injection nozzle 48 near the intake valve, the fuel supply to the combustion chamber is carried out in a very short period of time accordingly quick response of the engine running to varying engine operating conditions can be obtained particularly during rapid acceleration, preventing engine troubles such as stumble or hesitation of engine running.

(3) By virtue of improved character of the air-fuel mixture inducted into the combustion chamber, the engine running at idling is considerably improved. Additionally, the supply of the air-fuel mixture into the combustion chamber can be effectively achieved even under low temperature condition, which improves engine starting.

(4) The high speed air stream ejected into the combustion chamber can generate swirl of the air-fuel mixture in the combustion chamber to improve the character of the air-fuel mixture. The swirl can be maintained throughout compression and expansion stroke of the engine to increase the combustion speed of the air-fuel mixture, which improves fuel economy, engine stability on lean mixture combustion, and exhaust emission control on exhaust gas recirculation.

(5) Since the high speed air stream ejected into the intake passageway is produced by the pressure difference generated between the upstream and downstream sides of the throttle valve, it is unnecessary to employ a separate air pressurizing device such as air pump and according the construction of the engine is rendered simple and production cost thereof is rendered low.

While high speed air has been shown and described to be ejected from the elongate air ejecting opening 46, it will be understood that other mixed fluid such as EGR gas may be ejected from the opening 46 in order to accomplish the same effect as mentioned above.

Although only one air flow meter has been shown and described to sense whole air flow amount inducted through the intake passageway, it will be appreciated that two air flow meters may be separately installed to sense the air flow amounts of the intake manifold 28 and the additional air passage 44, as the needs of the case demand.

What is claimed is:

1. An internal combustion engine having a combustion chamber and an intake valve seatable on a valve seat, comprising:
    means for defining an intake passageway through which the combustion chamber is communicable with atmospheric air, a throttle valve being pivotally disposed in said intake passageway;
    a fuel injector including a fuel injection nozzle which is projected into the intake passageway downstream of the throttle valve and immediately upstream of the combustion chamber;
    means defining a straight elongate opening located adjacent the nozzle of said fuel injector, the axis of said straight elongate opening intersecting the axis of the nozzle of said fuel injector at a predetermined angle;
    means defining an additional air passage through which said elongate opening is communicable with said intake passageway upstream of said throttle valve;
    means defining an air chamber which is located around the valve stem of said intake valve and communicates with said additional air passage, said straight elongate opening being communicable with said air chamber, said air chamber defining means including a cup-shaped wall section which is formed with an opening through which the interior of said cup-shaped wall section communicates with said additional air passage, said straight elongate opening being formed through said cup-shaped wall section, and an annular valve member secured on the valve stem of said intake valve, the annular periphery of said valve member slidably contacting the inner cylindrical surface of said cup-shaped wall section, said air chamber being defined by the inner surface of said cup-shaped wall section and the annular surface of said valve member.

2. An internal combustion engine as claimed in claim 1, said intake passageway is provided therein with a part of an air flow meter for sensing air flow amount passing through said intake passageway, said additional air passage communicating with said intake passageway between said part of said air flow meter and said throttle valve.

3. An internal combustion engine as claimed in claim 1, in which said annular valve member is located to close said elongate opening to block communication between the elongate opening and said air chamber, when said intake valve is closed.

4. An internal combustion engine as claimed in claim 3, in which said straight elongate opening is such formed that the extension of the axis thereof reaches the combustion chamber through a clearance between the valve head of said intake valve opened and said valve seat.

5. An internal combustion engine as claimed in claim 3, in which the axis of said straight elongate opening intersects the axis of the nozzle of said fuel injector at an angle ranging from 30° to 120°.

6. An internal combustion engine as claimed in claim 5, in which said angle is 60°.

7. An internal combustion engine as claimed in claim 3, in which said cup-shaped wall section includes an extension of a cylindrical valve guide by which the valve stem of said intake valve is slidably supported.

8. An internal combustion engine as claimed in claim 2, in which said straight elongate opening defining means includes a pipe projecting into the intake passageway downstream of said throttle valve, said pipe being formed with a straight elongate portion in which said straight elongate opening is formed, the tip of said straight elongate portion being located immediately upstream of the combustion chamber.

9. An internal combustion engine as claimed in claim 8, in which the axis of the straight elongate portion of said pipe intersects the axis of the nozzle of said fuel injector at an angle ranging from 30° to 120°.

* * * * *